United States Patent
Smola et al.

(10) Patent No.: US 9,569,517 B1
(45) Date of Patent: Feb. 14, 2017

(54) FAULT TOLERANT DISTRIBUTED KEY-VALUE STORAGE

(71) Applicant: Google Inc., Mountain View, CA (US)

(72) Inventors: Alexander Johannes Smola, Sunnyvale, CA (US); Amr Ahmed, Mountain View, CA (US); Eugene Jon Shekita, San Jose, CA (US); Bor-yiing Su, Albany, CA (US); Mu Li, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 199 days.

(21) Appl. No.: 14/136,633

(22) Filed: Dec. 20, 2013

Related U.S. Application Data

(60) Provisional application No. 61/909,583, filed on Nov. 27, 2013.

(51) Int. Cl.
G06F 17/30 (2006.01)
(52) U.S. Cl.
CPC ... *G06F 17/30581* (2013.01); *G06F 17/30575* (2013.01); *G06F 17/3023* (2013.01); *G06F 17/30088* (2013.01); *G06F 17/30174* (2013.01); *G06F 17/30179* (2013.01); *G06F 17/30569* (2013.01)

(58) Field of Classification Search
CPC .. G06F 3/065; G06F 11/2069; G06F 11/2082; G06F 11/2028; G06F 17/30174; G06F 17/30575; G06F 17/30179; G06F 17/30569; G06F 17/3023; G06F 17/30088
USPC . 707/639, 613, 610; 711/162, 117; 709/217; 714/25, 4.11, 16, 6, 16.6
See application file for complete search history.

(56) References Cited

U.S. PATENT DOCUMENTS

| | | | | | |
|---|---|---|---|---|---|
| 5,440,727 | A | * | 8/1995 | Bhide et al. | 711/117 |
| 5,559,764 | A | * | 9/1996 | Chen et al. | 709/217 |
| 5,838,921 | A | * | 11/1998 | Speeter | H04Q 11/0478 709/226 |
| 6,253,211 | B1 | * | 6/2001 | Gillies | G06F 11/2056 707/610 |
| 6,618,817 | B1 | | 9/2003 | Armstrong | |
| 6,826,182 | B1 | * | 11/2004 | Parthasarathy | 370/390 |
| 7,054,960 | B1 | * | 5/2006 | Bezbaruah et al. | 710/33 |

(Continued)

FOREIGN PATENT DOCUMENTS

EP 1 617 331 B1 10/2013

OTHER PUBLICATIONS

Amar Phanishayee, Chaining for Flexible and High Performance Key-Value Systems, CMU-CS-12-139, Sep. 2012, 148 pages.*

(Continued)

*Primary Examiner* — Frantz Coby
(74) *Attorney, Agent, or Firm* — Fish & Richardson P.C.

(57) ABSTRACT

Methods, systems, and apparatus, including computer programs encoded on computer storage media, for handling faults in a distributed key-value storage system. One of the methods includes receiving an indication that a machine storing a primary replica of a first replication chain is inactive, in response to receiving the indication, generating a concatenated replica comprising a first replica of the first replication chain and a second replica of a second replication chain, the second replication chain comprising replicas of a second key segment, the second key segment being adjacent to the first key segment in the multiple key segments of the plurality of keys, and providing, to another machine in the ordered sequence of machines, a notification of availability of the concatenated replica.

16 Claims, 6 Drawing Sheets

(56) References Cited

U.S. PATENT DOCUMENTS

| | | | | |
|---|---|---|---|---|
| 7,107,396 | B2* | 9/2006 | Factor et al. | 711/112 |
| 7,117,393 | B2* | 10/2006 | Baba et al. | 714/25 |
| 7,152,182 | B2* | 12/2006 | Ji | G06F 11/2069 711/162 |
| 7,178,055 | B2* | 2/2007 | Ji | G06F 11/2069 711/162 |
| 7,380,081 | B2* | 5/2008 | Ji | G06F 11/2066 710/52 |
| 7,490,115 | B2* | 2/2009 | Banks | G06F 17/30356 |
| 7,624,155 | B1* | 11/2009 | Nordin | G06F 11/2094 709/208 |
| 7,912,896 | B2* | 3/2011 | Wolovitz | H04L 12/5895 709/203 |
| 7,937,618 | B2 | 5/2011 | Dorai et al. | |
| 8,001,078 | B2* | 8/2011 | Banks | G06F 17/30356 707/615 |
| 8,244,671 | B2* | 8/2012 | Chen et al. | 707/610 |
| 8,533,525 | B2* | 9/2013 | Matsugashita | 714/4.11 |
| 8,572,031 | B2* | 10/2013 | Merriman et al. | 707/613 |
| 8,656,454 | B2* | 2/2014 | Gunawardena et al. | 726/1 |
| 9,141,685 | B2* | 9/2015 | Ananthanarayanan | G06F 17/30578 |
| 9,160,809 | B2* | 10/2015 | Carney | H04L 67/32 |
| 9,207,930 | B2* | 12/2015 | Srivas | G06F 8/68 |
| 2002/0032883 | A1* | 3/2002 | Kampe et al. | 714/16 |
| 2004/0103342 | A1* | 5/2004 | Moser et al. | 714/6 |
| 2006/0020635 | A1* | 1/2006 | Green | 707/200 |
| 2006/0101214 | A1* | 5/2006 | Mikami | 711/162 |
| 2009/0187600 | A1* | 7/2009 | Winbom | 707/200 |
| 2009/0249003 | A1* | 10/2009 | Bates | G06F 11/2061 711/162 |
| 2011/0191295 | A1* | 8/2011 | Ozdemir et al. | 707/639 |
| 2011/0213994 | A1* | 9/2011 | Thereska et al. | 713/320 |
| 2011/0313973 | A1* | 12/2011 | Srivas | G06F 17/30194 707/634 |
| 2012/0158659 | A1* | 6/2012 | Marathe et al. | 707/639 |
| 2013/0185603 | A1 | 7/2013 | Parra et al. | |
| 2013/0232310 | A1* | 9/2013 | Kruus | 711/162 |
| 2014/0201363 | A1* | 7/2014 | McAlister | G06F 11/3006 709/224 |

OTHER PUBLICATIONS

Renesse et al., Chain Replication for Supporting High Throughput and Availability, OSDI'04 Proceedings of the 6th conference on Symposium on Opearting Systems Design & Implementation—vol. 6 pp. 1-14 2004.*

Escriva et al., HyperDex: A Distributed, Searchable Key-Value Store, HyperDex: SIGCOMM'12, Aug. 13-17, 2012, Helsinki, Finland, pp. 25-36.*

Lamport, Leslie, "Keynote: Recent Discoveries from Paxos"; Proceedings of the 2004 International Conference on Dependable Systems and Networks, Sep. 2004, abstract, 1 page.

Mitzenmacher et al., "Probability and Computing: Randomized Algorithms and Probabilistic Analysis"; Cambridge University Press, 2005, 366 pages.

Anderson, "Improving End-to-End Availability Using Overlay Networks", Massachusetts Institute of Technology, Feb. 2005, 150 pages.

Stoica et al., "Chord: A Scalable Peer-to-Peer Lookup Service for Internet Applications", SIGCOMM '01, Aug. 27-31, 2001, San Diego, California, USA, 12 pages.

Ahmed et al., "Scalable Inference in Latent Variable Models", WSDM '12, Feb. 8-12, 2012, Seattle, Washington, USA, 10 pages.

Byers, et al., "Simple Load Balancing for Distributed Hash Tables," 2003, 5 pages.

Karger, et al., "Consistent Hashing and Random Trees: Distributed Caching Protocols for Relieving Hot Spots on the World Wide Web", May 1997, 10 pages.

Li et al., "Parameter Server for Distributed Machine Learning," published in the proceedings of the NIPS 2013 workshop on parallel and large-scale machine learning systems (Dec. 9, 2013), 10 pages.

* cited by examiner

FAULT TOLERANT DISTRIBUTED KEY-VALUE STORAGE

CROSS-REFERENCE TO RELATED APPLICATION

This application claims priority to U.S. Provisional Application Ser. No. 61/909,583, filed on Nov. 27, 2013, entitled "Fault Tolerant Distributed Key-Value Storage", the entire contents of which are hereby incorporated by reference.

BACKGROUND

This specification relates to distributed systems.

Distributed systems include multiple computers connected together using one or more networks. The separate computers may coordinate actions or tasks by passing messages to other computers in the distributed system. The computers may interact to achieve a common goal, such as the storage or analysis of data for a particular task. Some example applications of distributed systems include distributed databases, network files systems, distributed information processing systems, and distributed computing, e.g., to solve computational and/or scientific problems.

SUMMARY

In general, one innovative aspect of the subject matter described in this specification can be embodied in methods that include the actions of receiving an indication that a machine storing a primary replica of a first replication chain is inactive, wherein a replication chain includes multiple replicas of keys and values for a particular key segment of a plurality of keys, the plurality of keys being segmented into multiple key segments, with adjacent key segments being stored on adjacent machines of an ordered sequence of machines, wherein each machine stores a primary replica of a first key segment of a primary replication chain and a secondary replica of an adjacent second key segment of a secondary replication chain, wherein each machine propagates updates to keys and values of the first key segment to an adjacent machine down the primary replication chain, and wherein each machine receives updates to keys and values for the second key segment from a machine up the secondary replication chain, in response to receiving the indication, generating a concatenated replica comprising a first replica of the first replication chain and a second replica of a second replication chain, the second replication chain comprising replicas of a second key segment, the second key segment being adjacent to the first key segment in the multiple key segments of the plurality of keys, and providing, to another machine in the ordered sequence of machines, a notification of availability of the concatenated replica. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. Providing a notification of availability of the concatenated replica may comprise providing a notification of availability of a primary replica of a concatenated key segment comprising the first key segment and the second key segment. Providing the notification of availability of the primary replica of the concatenated key segment may comprise providing a notification of availability of a third replication chain that stores replicas of the first key segment and the second key segment.

In some implementations, the replication chain includes k replicas. The method may comprise providing a copy of a secondary replica of the first replication chain to a kth machine in the second replication chain, wherein the kth machine will store the kth replica of the concatenated key segment. The method may comprise receiving a secondary replica of the first replication chain, receiving a primary replica of the second replication chain, storing the primary replica and the secondary replica in adjacent memory blocks, wherein generating the concatenated replica comprises generating a replica that includes the adjacent memory blocks. A liveness server may communicate availability of the concatenated key segment to one or more clients.

In general, another innovative aspect of the subject matter described in this specification can be embodied in methods that include the actions of receiving an indication that a new machine has been inserted into an ordered sequence of machines, wherein machines in the sequence store multiple replication chains, wherein a replication chain includes multiple replicas of keys and values for a particular key segment of a plurality of keys, the plurality of keys being segmented into multiple key segments, with adjacent key segments being stored on adjacent machines in the ordered sequence of machines, wherein each machine stores a primary replica of a first key segment of a primary replication chain and a secondary replica of an adjacent second key segment of a secondary replication chain, wherein each machine propagates updates to keys and values of the first key segment to an adjacent machine down the primary replication chain, and wherein each machine receives updates to keys and values for the second key segment from a machine up the secondary replication chain, in response to receiving the indication, segmenting a first replica of the first replication chain into a second replica having keys of a first key segment and a third replica having keys of a second key segment, providing a copy of the second replica to the new machine, wherein the new machine stores the second replica as a primary replica of a new, second replication chain, and providing, to another machine in the ordered sequence of machines, a notification of modification of the first replication chain to include only keys of the second key segment. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. The method may comprise designating the second replica as a secondary replica of the new, second replication chain. The method may comprise providing, to another machine in the ordered sequence of machines, a notification of availability of the new, second replication chain for the first key segment.

The subject matter described in this specification can be implemented in particular embodiments so as to realize one or more of the following advantages. A system can survive minor failures without interruption or the need for a restart of the system. For example, when a very small quantity of servers in the system become inactive, the system may experience a delay around the order of 1-10 milliseconds and when a small quantity of servers in the system become inactive the system may experience a delay around the order of tens of milliseconds. The system may only require that the state of a server is communicated to other devices in the system. The system may require the use of less network bandwidth by periodically sending replicas to backup servers. The concatenation of two adjacent key segments on a server may reduce the amount of data transfer when a server becomes inactive. For example, the adjacent key segments may be stored in contiguous segments in memory and may be assigned to the same key segment when a primary server for one of the segments fails. The use of multiple virtual machines on a physical server reduces the size of changes on other physical servers in a system. For example, when a single physical server becomes inactive, multiple other physical servers will have smaller changes for the virtual machines that contain backup data previously maintained by the inactive server compared to a single physical machine with a single change. The use of virtual machines on a physical server may allow adjustment of both the capacity on the servers and the granularity of key segments assigned to virtual machines dynamically at runtime without the need to shut down the physical servers. The use of a number p of virtual machines on a physical server can result in downtime that is only on the order of $1/p^2$.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Some distributed systems require the storage of data on multiple machines and can tolerate the loss of data. For example, a distributed machine learning system may include multiple machines that each work on a different part of a problem. The machines may be implemented as one or more physical computers or as software installed as a virtual machine on a physical computer. Computations from all of the machines can be combined to provide a complete solution to the problem. This type of system can incur less overhead when handling faults than other systems that might maintain exact copies of data.

In some examples, each of the machines in the distributed system stores key-value pairs for a particular segment of keys. As the machines update the values in the key-value pairs, the machines may periodically send replicas of the key-value pairs to other machines based on an order of the machines in the distributed system.

If one of the machines fails, the system uses the order of the machines to identify another machine that includes a replica of the key-value pairs that were previously stored on the failed machine and merges the replica with another segment of key-value pairs maintained by the other machine. The other machine may then need to make updates to the combined key-value pairs that were previously made by the failed machine but not copied to the other machine.

The other machine sends replicas of the combined key-value pairs to additional machines in the distributed system in the case of a failure of the other machine. The additional machines include at least one machine that did not previously store data from both segments of key-value pairs in the combined segment. For example, the distributed system may require that a minimum number of machines store replicas of each segment, and, when a machine fails, the system identifies a new machine to store a replica of the segment previously maintained by the failed machine.

The distributed system may also allow dynamic insertion of new machines into the system. For example, as the load of the system increases, new machines may be added to the system without requiring a restart of the system. The distributed system identifies a segment of key-value pairs for the new machine, copies the segment from a machine that previously maintained the segment, e.g., as part of a larger segment, queues updates for the segment during the replication process, and updates the segment using the queued updates once the replication process is completed.

Figure 1:
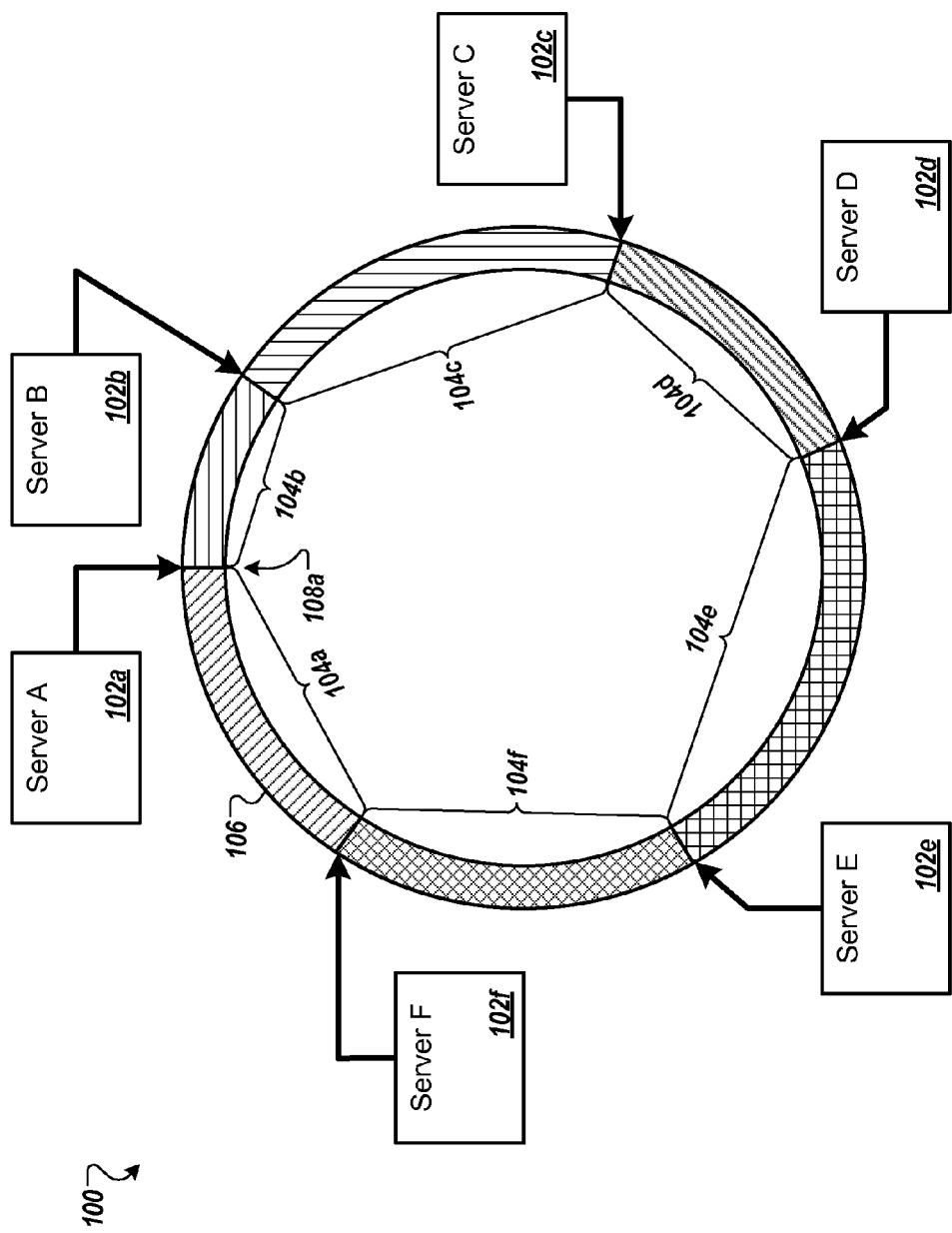
FIG. 1 illustrates an example system of servers assigned to key segments in a distributed hash table.

FIG. 1 illustrates an example system 100 of servers 102a-f assigned to key segments 104a-f in a distributed hash table 106. The distributed hash table 106 is structured as a ring and orders the keys in the key segments 104a-f so that adjacent key segments are stored on adjacent servers in the system 100. For example, the keys can be randomly assigned to a position in the distributed hash table 106 and a group of adjacent keys can be assigned to a single key segment. The distributed hash table 106 may any type of sequence structure instead of a ring structure.

In some examples, the key segments are created using a random assignment of a key from the distributed hash table 106 to a server. For example, each of the servers A-F 102a-f selects a location in the hash table 106 randomly. For example, each of the servers randomly determines a numeric value for one of the keys from the hash table 106 and is assigned a key segment 104a-f in the hash table 106 to the left of the selected key, as indicated by the location of a key 108a assigned to the server A 102a. The keys may be assigned to the servers A-F 102a-f such that each of the servers has a minimum number of keys in the key segment assigned to the server. The minimum number of keys may be determined using the total quantity of keys in the hash table 106 and/or the total number of servers in the system 100.

The server A 102a maintains a copy of the key segment A 104a and the corresponding values, e.g., in memory or on disk, and performs actions using the values, e.g., calculations using the values or provides some of the values in response to data requests. For example, each value may be the sum of values received from clients, e.g., as projected onto a convex set.

The server A 102a continues to update the values corresponding to the key segment A 104a, for example, by determining updated sum values from the values received from the clients.

The server A 102a provides a replica of the key segment A 104a and the corresponding values to a predetermined number of backup servers, e.g., three, according to a backup schedule. The number of backup machines may be predetermined, e.g., by a system administrator, or based on the total number of keys or the number of the servers 102a-f in the system 100. For example, the server A 102a may provide a replica of the key segment A 104a to the servers B-D 102b-d as part of the replication process.

The server A 102a may provide slightly different copies of the key segment A 104a to the backup servers, particularly when the server A 102a provides the copies at different times. For example, when the server A 102a continues to update the values for the key segment 104a, e.g., by continuing to determine updated sum values, the server A 102a may provide a first replica to the server B 102b and, at a later time, a second replica to the server C 102c where the second replica includes more recent data than the first replica.

The server A 102a may provide the same replica of the key segment A 104a and corresponding values by queuing data updates, e.g., updates to the sum values or requests while sending the copies to the backup servers. Thus, one or more of the backup servers receive the same replica of the key segment A 104a and the corresponding values. When the transfer of the data to the backup servers is complete, the server A 102a updates the values using the queued data updates and responds to any queued data requests. The server A 102a may also respond to data requests while copying the data to the backup servers and queuing updates for the data.

In FIG. 1, each of the key segments 104a-f has a primary replica and backup replicas. The server A 102a includes a primary replica of the key segment 104a along with corresponding values, and the servers B-D 102b-d include backup replicas of the key segment 104a along with corresponding values. Similarly, the server A 104a includes backup replicas of the key segments D-F 104d-f, while the primary replicas of those key segments are stored on the servers D-F 102d-f, respectively.

As each of the servers A-F 102a-f updates the values corresponding with the key segments A-F 104a-f, the servers A-F 102a-f provide copies of the values and key segments A-F 104a-f, respectively, to the other servers that store key segment replicas for a replication chain. Each replication chain includes a primary replica of a key segment stored on a primary server, e.g., the most up to date version, and one or more backup replicas of the key segment that store copies of the key segment and corresponding values. A server that stores the primary replica for a replication chain may be referred to as the master for the replication chain. The backup replicas are distributed across adjacent machines in the ordered ring of machines and may be referred to as backup servers for the replication chain. The primary replica and the backup replicas may be slightly different depending on when the data was received, e.g., if the backup replicas were recently provided to the adjacent machines.

The replication chain A for the key segment A 104a includes a primary replica stored on server A 104a as the primary server and backup replicas on each of the servers B-D 102b-d as the backup servers. Similarly, the replication chain D for the key segment D 104d includes a primary replica stored on the server D 102d as the primary server and backup replicas on each of the servers E-F 102e-f and A 102a as the backup servers.

The location of the servers A-F 102a-f determines an order of the servers in the system 100. For example, when the server A 102a determines that the key segment 104a and the corresponding values should be backed up, the server A 102a determines the number of backup servers for the system 100 and the backup servers that store replicas for the replication chain A using a number of backup servers, e.g., predetermined or specified by a user, and the order of the servers, e.g., to identify the servers B-D 102b-d, and provides the identified servers with replicas of the key segment 104a and corresponding values.

Figure 2:
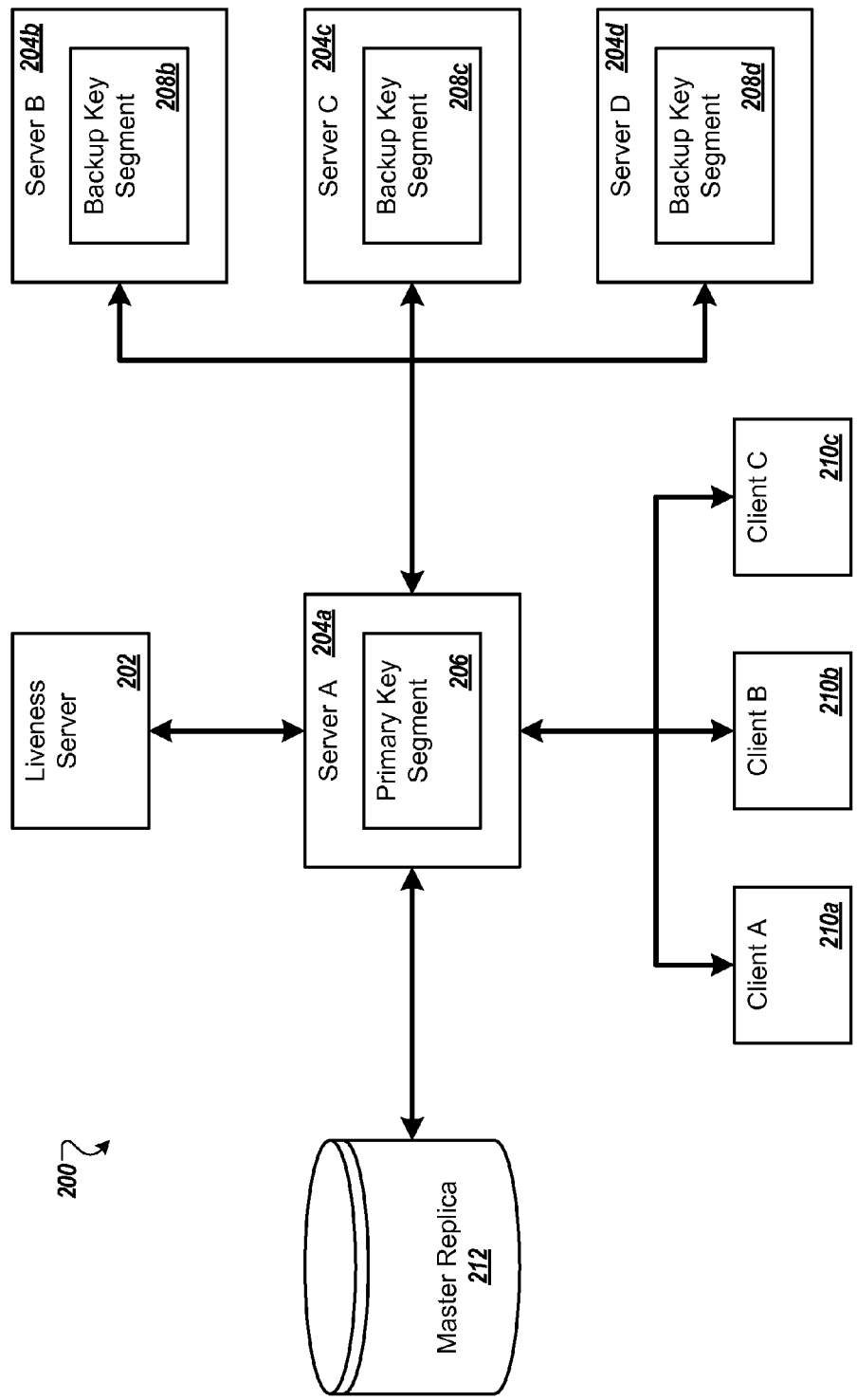
FIG. 2 illustrates an example system having a liveness server that monitors the state of the other servers in the system.

FIG. 2 illustrates an example system 200 having a liveness server 202 that monitors the state of the other servers in the system 200. For example, each of the servers 204a-d periodically sends a heartbeat signal to the liveness server 202 to request the most recent liveness information of the other servers in the system 200. In some examples, the request for liveness information may include the state of the requesting server, e.g., the liveness of the requesting server. The state may include unavailable, available, ready, and inactive. A server may become unavailable when the server needs to perform some form of processing. The server may be in the unavailable state for a very short time, e.g., milliseconds. A server may become available when the server can receive a payload. A server may be ready when the server can reply to and receive requests. All other servers may be considered inactive by default.

The liveness server 202 responds to the heartbeat signal with liveness information of the other servers in the system 200 and the servers 204a-d use the liveness information to determine the master server for each key segment and the corresponding replication chain and the backup servers that store key segment replicas for the replication chain.

For example, the server A 204a may include a primary key segment 206 that includes a key segment and corresponding values and request liveness information from the liveness server 202. The server A 204a uses the liveness information to determine that the servers B-D 204b-d store replicas of the primary key segment 206 and provide backup key segments 208b-d that are copies of the primary key segment 206 to the servers B-D 204b-d.

If one of the servers 204a-d determines that another server is inactive, e.g., when the server A 204a tries to send the backup key segment 208c to the server C 204c and the server C 204c does not respond, the server provides an update to the liveness server 202 that identifies the server that is inactive, e.g., the server C 204c. The liveness server 202 provides the updated liveness data to the servers in the system 200 upon request, e.g., in response to the heartbeat signal. In some examples, the liveness server 202 may determine that a server is inactive when the liveness server 202 does not receive a heartbeat signal from the server within a predetermined period of time.

In some implementations, the liveness server 202 may receive liveness data from a client 210a-c. For example, the client A 210a may request data from the server A 204a and determine that the server A 204a is inactive, e.g., when the server A 204a does not respond to the request within a predetermined period of time. The client A 210*a* may then provide data to the liveness server 202 indicating that the server A 204*a* is inactive.

The client A 210*a* may request information identifying another server, e.g., the server B 204*b*, to which the client A 210*a* may send a request for the required data. The liveness server 202 may use this request from the client A 210*a* as an indication that the server A 204*a* is inactive and provide identification information for the server B 204*b* to the client A 210*a*, e.g., the liveness server 202 may provide an internet protocol address.

The clients 210*a-c* may be other servers, e.g., that respond to data requests from user devices. In some implementations, the clients 210*a-c* are user devices operated by an end user.

When a server in the system 200 receives a request or an update for a key segment that another server maintained, the server may determine that the other server is inactive and provides updated liveness information to the liveness server 202. For example, when the server B 204*b* receives a request for data from the backup key segment 208*b*, the server B 204*b* responds to the request with data from the backup key segment 208*b*, which may be slightly older than data previously stored on the server A 204*a*, and provides information to the liveness server 202 indicating that the server A 204*a* is inactive.

The system 200 includes a master replica 212 that stores a master copy of the key segments from the servers 204*a-d*. The master replica 212 can be used to initialize the servers 204*a-d* and can be used as a backup if all of the servers that store key segments for a particular replication chain should fail.

In some examples, one or more liveness synchronization servers receive liveness information from the liveness server 202 and broadcast the liveness information to the other servers in the system 200. For example, a liveness synchronization server may provide the liveness information to the other servers so that the other servers all include the same liveness information for the servers in the system 200. The liveness synchronization server may provide liveness information to the other servers in the system 200 only when the liveness information has changed, e.g., when a server becomes inactive or a new server is added to the system 200.

The liveness server 202 and/or the liveness synchronization servers may also serve data by storing primary or backup replicas of key segments. For example, the server C 204*c* may also serve the functions of a liveness synchronization server.

Each of the servers 204*a-d* may store both a primary replica for a first replication chain and one or more backup replicas for respective other replication chains. In some implementations, the servers 204*a-d* store primary replicas in memory designed for fast random access by a processor, e.g., dynamic random-access memory (DRAM), and the servers 204*a-d* store backup replicas in non-volatile mass storage memory, e.g., flash or disk memory.

The system 200 may prevent a single server from hosting both a primary replica and a backup replica for a same replication chain or multiple replicas for a single replication chain. For example, the system 200 can prevent two virtual machines hosted on a single physical machine from storing replicas in a same replication chain.

Figure 3:
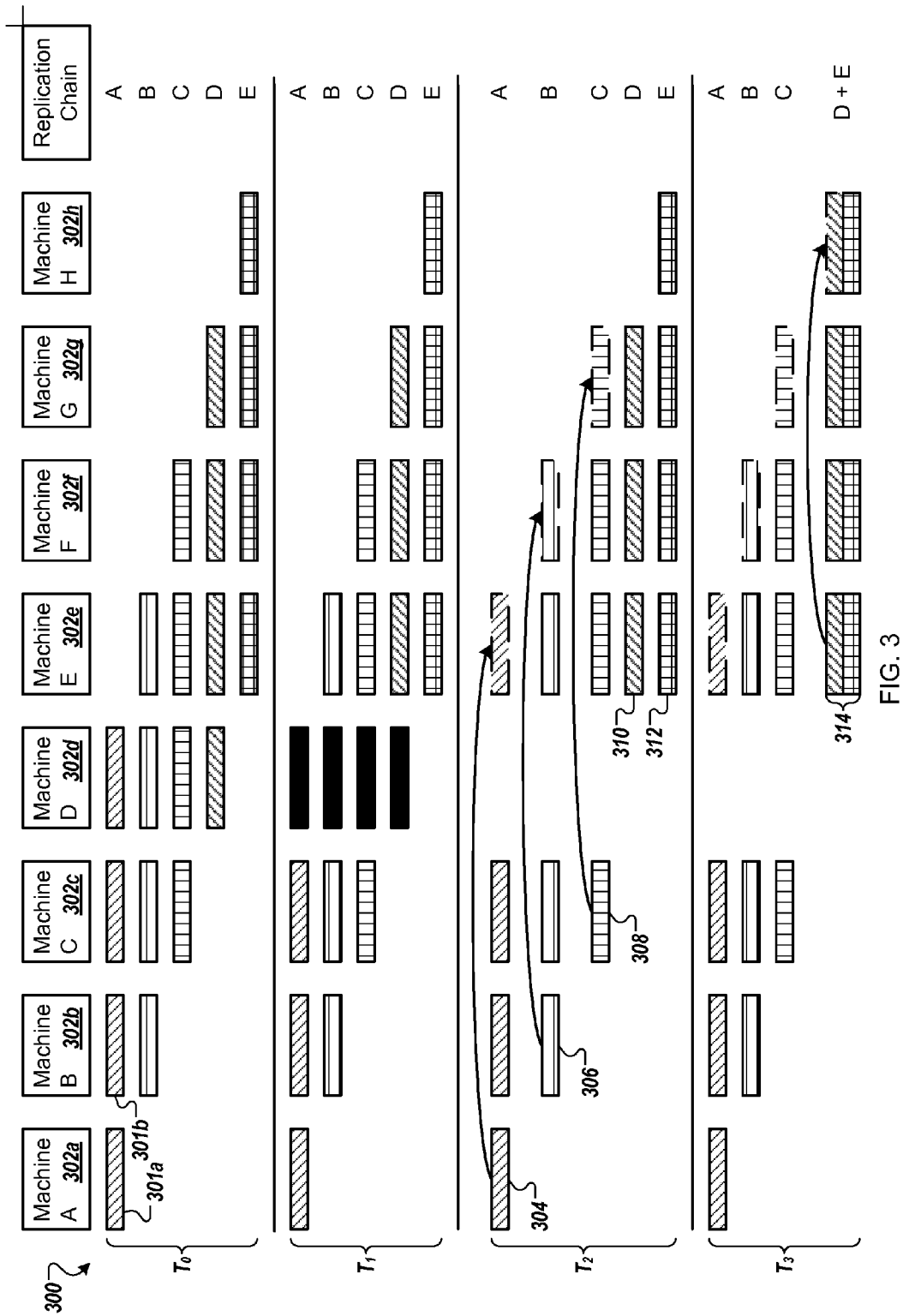
FIG. 3 illustrates concatenating two replicas from different replication chains when a machine becomes inactive.

FIG. 3 illustrates concatenating two replicas from different replication chains when a machine becomes inactive. The self-repair process between machines illustrated in FIG. 3 can be coordinated by the machines themselves or by a liveness server.

During time period $T_0$, machines A-E 302*a-e* store respective primary replicas of key segments, e.g., that include keys and corresponding values, for the replication chains A-E. Machines B-H 302*b-h* store respective backup replicas for the replication chains A-E. The machines A-E 302*a-e* may update the primary replicas of the key segments using updates received from another machine, e.g., a client device, or calculated by the respective machine and propagate the updates to other machines storing the backup replicas in the replication chain. For example, machine A 302*a* can update the primary replica 301*a* for replication chain A and provide the updated replica to be stored as backup replica 301*b* on machine B 302*b*.

At time $T_1$, machine D 302*d* becomes inactive. For example, the machine D 302*d* may have failed or an administrator may have removed the machine D 302*d* from the system. The determination that machine D 302*d* has failed can be performed by a liveness server in a system that includes the machines 302*a-h*, by one of the machines 302*a-h* that try to provide replicas to or otherwise communicate with machine D 302*d*, or by a client device that makes a request to machine D 302*d* and receives no response.

When a master machine for a particular replication chain determines that a backup machine for the replication chain is inactive, the master machine will identify an additional machine on the sequence to become a backup machine for the replication chain.

For example, during time period $T_2$, the system begins a self-repair process in response to the inactivity of the machine D 302*d*. The machine A 302*a*, as part of a backup schedule, identifies a new sequence of machines that will store key segment replicas for the replication chain A. Because machine D 302*d* is inactive, the machine A 302*a* identifies the next machine on the sequence that does not currently store a replica for the replication chain A, e.g., the machine E 302*e*. The machine A 302*a* thus provides a new replica 304 for the replication chain A to the machine E 302*e*.

Similarly, the machine B 302*b*, as the machine storing the primary replica of the replication chain B and in response to detecting that machine D 302*d* is inactive, identifies a next machine on the sequence that does not currently store a replica in the replication chain B, e.g., the machine F 302*f*. The machine B 302*b* then provides a replica 306 for the replication chain B to the machine F 302*f*. Likewise, the machine C 302*c* identifies the machine G 302*g* to store a replica for the replication chain C and provides a replica 308 for the replication chain C to the machine G 302*g*.

When a backup machine for a particular replication chain determines that the master machine for the replication chain is inactive, the backup machine can become a new master machine for the replication chain and identify an additional machine on the sequence to become a new backup machine for the replication chain. In addition, the new master can concatenate key segments for any replication chains for which it was already a master with a key segment of a replication chain for which it is the new master. Concatenating the key segments effectively coalesces the two previous replication chains into a new replication chain that includes keys from the key segments of the previous replication chains.

For example, during time period $T_3$, the machine E 302*e*, which was a backup machine for the replication chain D, determines that the master machine, e.g., the machine D 302*d*, for the replication chain D is inactive. Thus, the machine E 302*e* assumes the role of master machine for the replication chain D. The machine E 302*e* was also already the master machine for the replication chain E. Thus, the machine E 302e concatenates a backup replica 310 for replication chain D with a primary replica 312 for the replication chain E to generate a concatenated key segment 314.

Because the machine E 302e already stored both the replica 310 and the replica 312, the machine E 302e need not copy any data to generate the concatenated replica 314. Rather, the machine E 302e can merely redesignate memory blocks assigned to the replica 310 and the replica 312 as belonging to a same concatenated replica 314. For example, the machine E 302e can concatenate the replica 310 and the replica 312 by updating an internal table that identifies memory locations of replicas without transferring data from the replica 310 or the replica 312 to another portion of memory.

Furthermore, each of the machines can store primary or backup replicas for adjacent replication chains in adjacent segments of memory. Thus, when the machine E 302e concatenates the replica 310 and the replica 312, the concatenated replica 314 can be stored in contiguous segments of memory without the machine E 302e copying any data to generate the concatenated replica 314. Similarly, the machines F-G 302f-g also concatenate their respective replicas of the key segments for the replication chains D and E.

The machine E 302e also identifies a new backup machine for the new replication chain, the machine H 302h. The machine E 302e can then provide machine H 302h with only a replica 310 for the replication chain D, and the machine H can generate a concatenated key segment for the new replication chain. Thus, only a single copy of the replica 310 needs to be transferred in order for the system to recover from losing a master for a particular replication chain.

The machine E 302e can also provide data to other machines in the system to indicate that the machine E 302e is now the master for a new replication chain. For example, the machine E 302e may provide a liveness update to a liveness server that indicates the keys that the machine E 302e manages. In some examples, the machine E 302e provides data to the other machines that will host replicas for the concatenated replication chain indicating that the replication chains D and E have been concatenated and that the machine E 302e is the master for the new replication chain.

In some implementations, the machine E 302e may provide the machine H 302h with a replica 310 during the time period $T_2$, e.g., separately from the replica of the concatenated replica 314.

In some implementations, the process 300 may be performed for a single machine. For example, when a single virtual machine executing on a physical server encounters an error, the single virtual machine may be inactivated while the other virtual machines executing on the same physical server continue to maintain replicas.

In some implementations, the process 300 may be performed for multiple machines at the same time. For example, when a physical server becomes inactive, a liveness server may determine all of the virtual machines that executed on the physical server are inactive and the system may perform the process 300 for each of the virtual machines that previously executed on the inactive server. This determination may be based on the determination that a single one of the virtual machines on the server is inactive or that multiple virtual machines on the server, e.g., two, are inactive.

Figure 4:
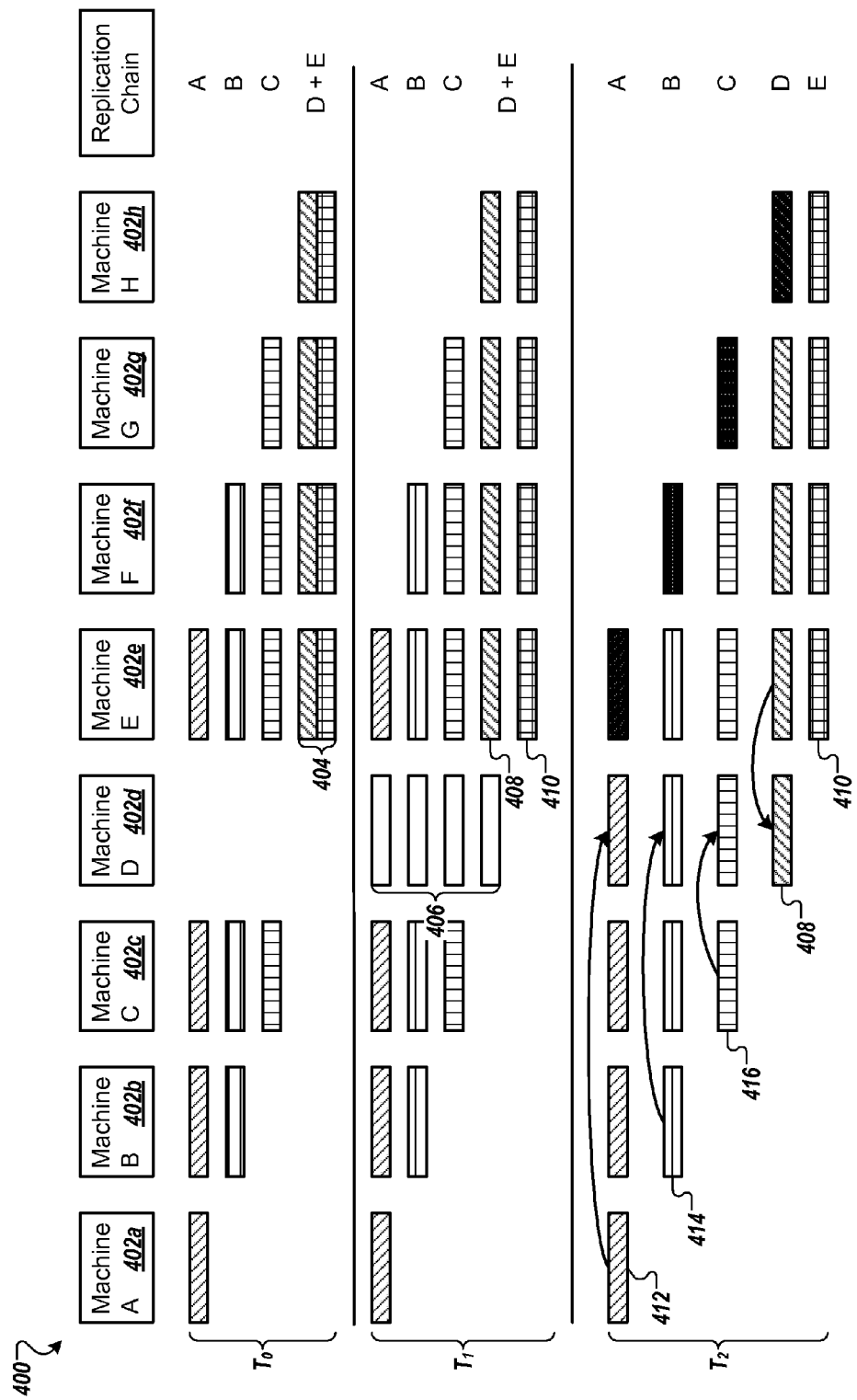
FIG. 4 illustrates adding a new machine to a system.

FIG. 4 illustrates adding a new machine to a system. During time period $T_0$, the system identifies a new machine D 402d to add to the machines 402a-c and 402e-h. The system, e.g., the machine D 402d or another machine in the system, determines a replication chain of a key segment for which the machine D 402d will become a master. For example, the machine D 402d determines a key from a hash table and uses the key to identify a key segment and corresponding values to maintain as master of a replication chain.

When a first master machine for a particular replication chain determines that a second machine has been inserted into the sequence as a new master machine, the first master machine can split a primary replica for its replication chain in two and provide one split to be maintained by the new master machine. Splitting the replica also effectively splits the replication chain into two separate replication chains.

For example, during time period $T_1$, the machine D 402d is placed in the ordered sequence of machines 402a-c and 402e-h and memory 406 on the machine D 402d is allocated for a primary key segment and backup key segments that will be stored on the machine D 402d.

The machine E 402e divides the primary key segment 404 into a primary replica 408, to be maintained by the machine D 402d, and a primary replica 410 to be maintained by the machine E 402e. For example, when the replica 408 and the replica 410 are stored in a contiguous segment of memory, the machine E 402e may split the segment of memory into two and update an internal memory table to identify the memory segments as storing replicas for two replication chains.

When the machine D 402d becomes a master for the new replication chain D, it may immediately begin receiving requests from clients and updates from other machines in the system. Thus, in some implementations, the other machines first provide backup replicas, e.g., the replicas 412, 414, and 416 allocated to the new machine D 402d, before the machine D 402d receives the replica 408 for which it will be the master. In the meantime, the machine E 402e can queue data requests and updates for the replica 408. Then, when the machine E 402e provides the primary replica 408 to the machine D 402d, the machine D 402d can begin to update the primary replica 408 using the queued requests and updates, as described in more detail below. The machine D 402d may receive the backup replicas 412, 414, and 416 c as part of a normal replication process or based on activation in the system.

In some examples, the machine D 402d stores each of the received replicas in contiguous blocks of memory. For example, the machine D 402d stores the replicas using the order of the key segments, e.g., as determined by a distributed hash table.

The machines E-H 402e-h remove a backup replica from memory during the time period $T_2$. For example, when the system maintains three replicas of every key segment and the machines E-H 402e-h are the last machines that store replicas of the primary key segments from the replication chains A-D, respectively, the machines E-H 402e-h remove the replicas of the key segments for the replication chains A-D, respectively, as the machines E-H 402e-h will no longer receive updated copies from the primary machines.

In some implementations, one or more of the time periods $T_0$, $T_1$, and $T_2$ may overlap. For example, one of the machines A-C 402a-c may provide a replica of the corresponding key segment 412-416 to the machine D 402d while the machine E 402e divides the primary key segment 404.

The process 400 may be performed for a single machine, e.g., a physical machine, or for multiple machines at the same time, e.g., multiple virtual machines executing on the same physical machine. In some examples, a server executes a new virtual machine and the system adds the new virtual machine to the system. The new virtual machine may be one of a plurality of virtual machines executing on the server where the other virtual machines in the plurality were previously added to the system. For example, the system may determine that the average size of the key segments maintained by the machines A-C 204*a-c* and the machines E-H 204*e-h* is greater than a predetermined threshold size and that the new virtual machine should be added to the system.

Figure 5:
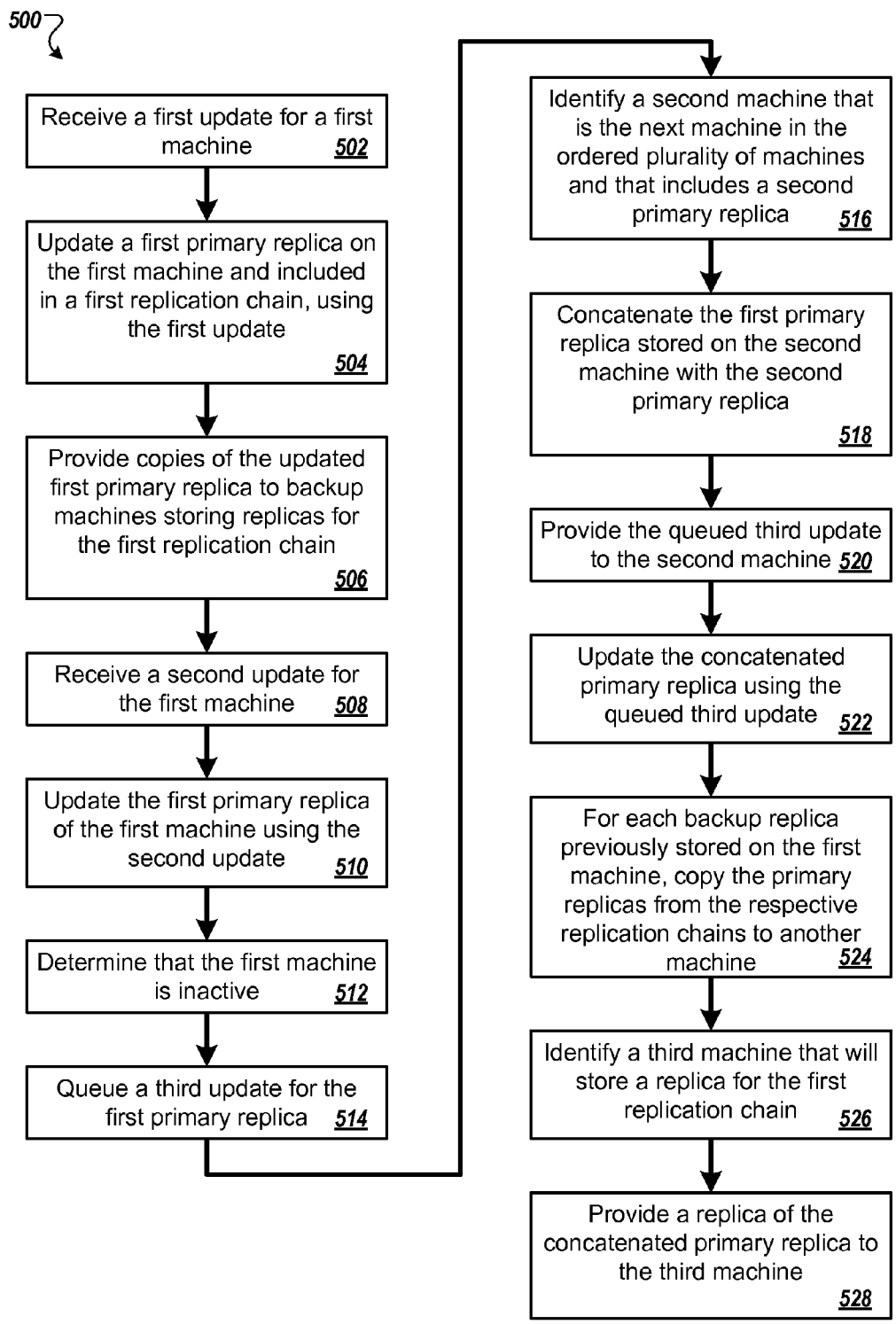
FIG. 5 is a flow diagram of an example process for concatenating two key segments.

FIG. 5 is a flow diagram of an example process 500 for concatenating two key segments. The process can be implemented by one or more computer programs installed on one or more computers. For example, the process 500 can be used by the servers 102*a-f* from the system 100.

A first machine receives a first update (502). The first machine is included in an ordered plurality of machines. Each machine in the ordered plurality of machines has a primary replica and one or more different backup replicas. Each of the replicas is included in a replication chain that includes a primary replica stored on a primary machine and one or more backup replicas stored on sequential machines that follow the primary machine in the ordered plurality of machines. For example, the first machine receives the first update for the primary replica stored on the first machine. The update may be received from another machine or may be computed by the first machine.

The first machine updates a first primary replica, on the first machine and included in a first replication chain, using the first update (504).

The first machine provides copies of the updated first primary replica to the other machines that will store replicas for the first replication chain (506). For example, the first machine uses the order of the machines to identify the other machines and provides copies of the updated first primary replica to the identified machines.

In some examples, the first machine does not maintain a list of the machines that store replicas for the first replication chain and identifies the other machines using the order of the machines upon initialization of a replication process. The other machines that store replicas for the first replication chain may change during the replication process, e.g., when one of the other machines does not respond to the first machine.

The first machine receives a second update (508). For example, the first machine computes the second update or receives the update from another machine. The first machine receives the second update after providing copies of the updated first primary replica to the backup machines that store replicas in the replication chain The first machine updates the first primary replica using the second update (510).

The system determines that the first machine is inactive (512). For example, a liveness server or another server that stores a replica for the first replication chain determines that the first machine is inactive.

The system queues a third update for the first primary replica (514). For example, the other server that stores a replica for the first replication chain queues the third update and any requests for data from the first primary replica.

The system identifies a second machine that is the next machine in the ordered plurality of machines and that includes a second primary replica (516). For example, the liveness server identifies the second machine. In some examples, the second machine determines that the first machine is inactive, determines that the second machine should now maintain the first primary replica, and queues updates and data requests for the first primary replica.

The second machine concatenates the first primary replica stored on the second machine with the second primary replica (518). For example, the second machine updates a table to indicate that first primary replica and the second primary replica are now part of the same primary replica and responds to requests for all of the keys in the concatenated replica.

The replica of the first primary key segment stored on the second machine does not include the updates made to the first primary replica using the second update. For example, the first machine updated the first primary replica after providing the first primary replica to the second machine and the data in the first primary replica is slightly outdated.

The second machine provides a notification to another machine in the ordered plurality of machines indicating that the second machine manages the concatenated key segment. For example, the other machine may use the notification to determine that requests for data from the concatenated key segment, which may have previously been sent to the first machine, should be sent to the second machine.

In some implementations, each of the other machines that store replicas for the first replication chain concatenate their respective copies of the first primary replica and the second primary replica. In some implementations, the other machines that store replicas for the first replication chain keep the copies of the first primary replica and the second primary replica separate until the other machines receive a the concatenated replica from the second machine.

The system provides the queued third update to the second machine (520). For example, when the liveness server queues updates for the first primary replica while the second machine concatenates the first primary replica with the second primary replica, the liveness server provides the third update to the second machine.

The second machine updates the concatenated primary replica using the queued third update (522). In some examples, when data requests for the first primary replica are queued, the second machine responds to the queued data requests.

For each backup replica previously stored on the first machine, the system copies the primary replicas from the respective replication chains to another machine (524). For example, as described above, for each replication chain with a replica stored on the first machine, other than the first replication chain, the master machine that stores the primary replica for the replication chain determines another machine, using the order of the machines, that will store a replica for the replication chain and provides the primary replica to the other machine. For example, a master machine provides a replica of the master machine's primary replica to the second machine.

The second machine identifies a third machine that will store a replica for the first replication chain (526). For example, the second machine identifies the third machine using the order of the machines.

The second machine provides a replica of the concatenated primary replica to the third machine (528).

The order of steps in the process 500 described above is illustrative only, and concatenating two replicas can be performed in different orders. For example, the system may queue the third update for the first primary replica, e.g., perform step 514, prior to determining that the first machine is inactive, e.g., step 512. For example, the system may queue the third update and determine whether the first machine is temporarily unable to accept the third update, e.g., and will be able to receive the third update later, or is inactive.

In some implementations, the process 500 can include additional steps, fewer steps, or some of the steps can be divided into multiple steps. For example, the process may include steps 502 through 506 and 512 through 522 without including the steps 508, 510, and 524 through 528.

Figure 6:
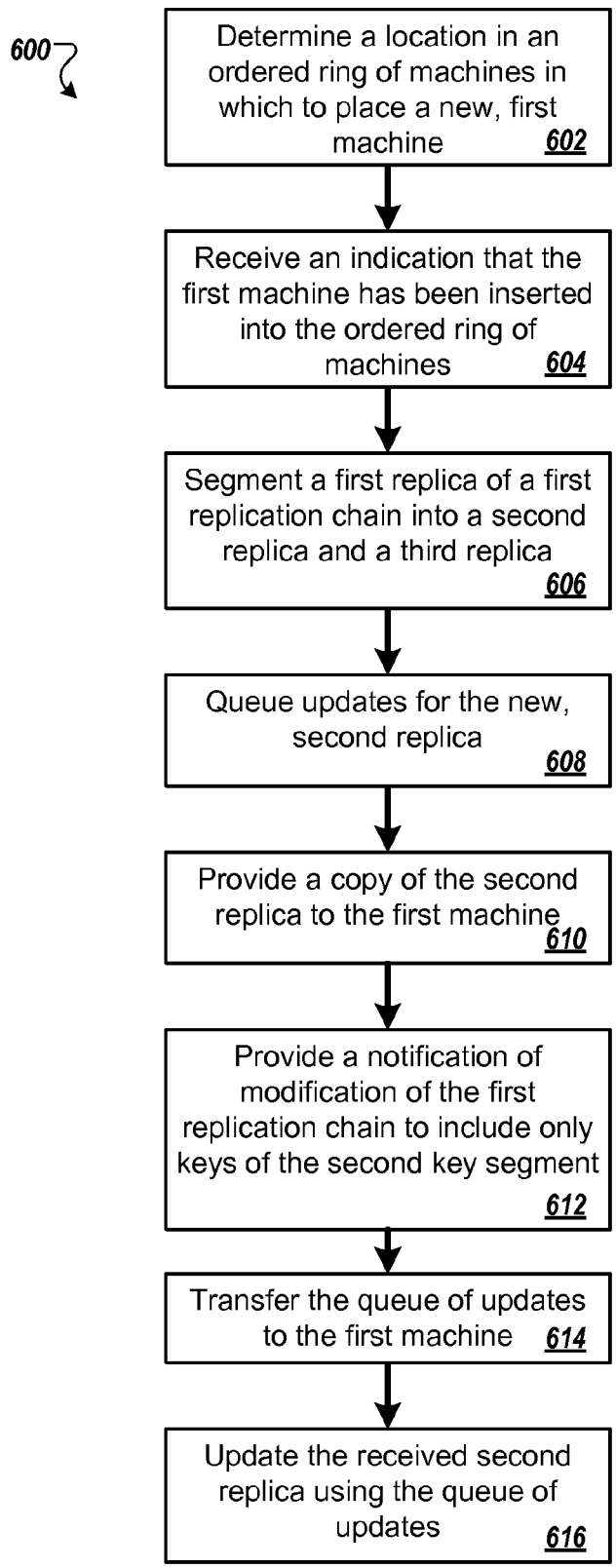
FIG. 6 is a flow diagram of an example process for inserting a new machine into a sequence.

FIG. 6 is a flow diagram of an example process 600 for inserting a new machine into a sequence. The process can be implemented by one or more computer programs installed on one or more computers. For example, the process 600 can be used by the system 100, e.g., one or more of the servers 102*a-f* from the system 100, when a new machine is added to the system 100.

The system determines a location in an ordered sequence of machines in which to place a new, first machine (602). For example, the first machine identifies a key in a distributed hash table and the identified key indicates the location of the first machine in the ordered sequence of machines. The location may be a location in the largest primary key segment maintained by a machine in the system and/or a random location.

A second machine receives an indication that the first machine has been inserted into the ordered sequence of machines (604). For example, the new machine may be a new virtual machine on a server or a new server that executes multiple virtual machines.

The second machine segments a first replica of a first replication chain into a second replica and a third replica (606). For example, the second machine uses the identified location in the first replica to create the second replica storing keys for a first key segment and the third replica storing keys for a second key segment, e.g., in response to receiving the indication that the new machine has been inserted into the ordered sequence of machines.

The second machine queues updates for the second replica (608). For example, the second machine ensures that no updates are made to the second replica while the second replica is transferred to the first machine. The second machine may queue requests for values in the second replica.

The second machine provides a copy of the second replica to the first machine (610). For example, the second machine transfers the second replica across a network to the new machine.

The second machine provides a notification of modification of the first replication chain to include only keys of the second key segment (612). For example, the second machine provides the notification to another machine in the ordered plurality of machines, e.g., another machine that stores a replica for the first replication chain or to a liveness server. The notification may identify the creation of a new replication chain for the first key segment.

The second machine transfers the queue of updates to the first machine (614). When the system receives additional updates or requests for data from the first key segment, the updates and requests are sent to the new, first machine instead of the second machine.

The first machine updates the received second replica using the queue of updates (616).

In some implementations, the process 600 can include additional steps, fewer steps, or some of the steps can be divided into multiple steps. For example, the second machine may update the second new primary key segment while creating the queue for the first new primary key segment and/or while copying the first new primary key segment to the first machine.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
  maintaining, by a machine learning system comprising a plurality of computers, multiple replication chains on a plurality of machines in an order,
    wherein each machine has a preceding machine and a subsequent machine in the order,
    wherein each machine stores multiple replicas from different replication chains, each replication chain being for a respective key segment of a plurality of keys, each key segment having a plurality of respective keys and respective values, each replication chain comprising multiple replicas of the respective key segment, and
    wherein each machine stores a primary replica of one of the replication chains and a secondary replica of a different one of the replication chains;
  receiving an indication that a first machine storing a first primary replica of a first replication chain is inactive; and
  in response to receiving the indication, performing the following operations by a second machine that is subsequent to the first machine in the order, wherein the second machine stores a second primary replica of a different second replication chain:

identifying a secondary replica of the first replication chain stored by the second machine, designating the secondary replica of the first replication chain stored by the second machine as a primary replica of the first replication chain, and serving data for master replicas of the first replication chain and the different second replication chain including generating, by the second machine, a concatenated replica comprising the first primary replica of the first replication chain and the second primary replica of the second replication chain.

2. The method of claim 1, further comprising providing a notification of availability of the concatenated replica including providing a notification of availability of a concatenated replication chain that stores replicas of a first key segment for the first replication chain and the second key segment for the second replication chain.

3. The method of claim 1, wherein each replication chain includes k replicas from a 1st replica to a kth replica, and further comprising:

providing a first replica of the first replication chain to a kth machine in the second replication chain, wherein the kth machine stores the kth replica of the concatenated replica.

4. The method of claim 1, further comprising:

receiving a secondary replica of the first replication chain;

receiving a primary replica of the second replication chain; and storing the primary replica and the secondary replica in adjacent memory blocks, wherein generating the concatenated replica comprises generating a replica that includes the adjacent memory blocks.

5. The method of claim 1, wherein a liveness server communicates availability of the concatenated replica to one or more clients of the machine learning system.

6. A machine learning system comprising:

one or more computers and one or more storage devices storing instructions that are operable, when executed by the one or more computers, to cause the one or more computers to perform operations comprising:

maintaining, by the machine learning system, multiple replication chains on a plurality of machines in an order, wherein each machine has a preceding machine and a subsequent machine in the order, wherein each machine stores multiple replicas from different replication chains, each replication chain being for a respective key segment of a plurality of keys, each key segment having a plurality of respective keys and respective values, each replication chain comprising multiple replicas of the respective key segment, and wherein each machine stores a primary replica of one of the replication chains and a secondary replica of a different one of the replication chains;

receiving an indication that a first machine storing a first primary replica of a first replication chain is inactive, and in response to receiving the indication, performing the following operations by a second machine that is subsequent to the first machine in the order, wherein the second machine stores a second primary replica of a different second replication chain:

identifying a secondary replica of the first replication chain stored by the second machine, designating the secondary replica of the first replication chain stored by the second machine as a primary replica of the first replication chain, and serving data for master replicas of the first replication chain and the different second replication chain including generating, by the second machine, a concatenated replica comprising the first primary replica of the first replication chain and the second primary replica of the second replication chain.

7. The system of claim 6, wherein the operations further comprise providing a notification of availability of the concatenated replica comprises providing a notification of availability of a concatenated replication chain that stores replicas of a first key segment for the first replication chain and a second key segment for the second replication chain.

8. The system of claim 6, wherein each replication chain includes k replicas from a 1st replica to a kth replica, and wherein the operations further comprise:

providing a first replica of the first replication chain to a kth machine in the second replication chain, wherein the kth machine stores the kth replica of the concatenated replica.

9. The system of claim 6, wherein the operations further comprise:

receiving a secondary replica of the first replication chain;

receiving a primary replica of the second replication chain; and storing the primary replica and the secondary replica in adjacent memory blocks, wherein generating the concatenated replica comprises generating a replica that includes the adjacent memory blocks.

10. The system of claim 6, wherein the operations further comprise a liveness server that communicates availability of the concatenated replica to one or more clients of the machine learning system.

11. A method comprising:

maintaining, by a machine learning system comprising a plurality of computers, multiple replication chains on a plurality of machines in an order, wherein each machine has a preceding machine and a subsequent machine in the order, wherein each machine stores multiple replicas from different replication chains, each replication chain being for a respective key segment of a plurality of keys, each key segment having a plurality of respective keys and respective values, each replication chain comprising multiple replicas of the respective key segment, and wherein each machine stores a primary replica of one of the replication chains and a secondary replica of a different one of the replication chains;

receiving an indication that a new machine has been inserted into the plurality of machines;

in response to receiving the indication, segmenting a first replica of the first replication chain into a second replica having keys of a first key segment and a third replica having keys of a second key segment;

providing a copy of the second replica to the new machine, wherein the new machine stores the second replica as a primary replica of a new, second replication chain; and providing, to another machine in the plurality of machines, a notification of modification of the first replication chain to include only keys of the second key segment.

12. The method of claim 11, further comprising designating, by a machine subsequent to the new machine in the order, the second replica as a secondary replica of the new, second replication chain.

13. The method of claim 11, further comprising providing, to another machine in the order, a notification of availability of the new, second replication chain for the first key segment.

14. A machine learning system comprising:

one or more computers and one or more storage devices storing instructions that are operable, when executed by the one or more computers, to cause the one or more computers to perform operations comprising:

maintaining, by the machine learning system, multiple replication chains on a plurality of machines in an order, wherein each machine has a preceding machine and a subsequent machine in the order, wherein each machine stores multiple replicas from different replication chains, each replication chain being for a respective key segment of a plurality of keys, each key segment having a plurality of respective keys and respective values, each replication chain comprising multiple replicas of the respective key segment, and wherein each machine stores a primary replica of one of the replication chains and a secondary replica of a different one of the replication chains;

receiving an indication that a new machine has been inserted into the plurality of machines;

in response to receiving the indication, segmenting a first replica of a first replication chain into a second replica having keys of a first key segment of the plurality of keys and a third replica having keys of a different second key segment of the plurality of keys;

providing a copy of the second replica to the new machine, wherein the new machine stores the second replica as a primary replica of a new, second replication chain; and providing, to another machine in the plurality of machines in the order, a notification of modification of the first replication chain to include only keys of the second key segment.

15. The system of claim 14, wherein the operations further comprise designating, by a machine subsequent to the new machine in the order, the second replica as a secondary replica of the new, second replication chain.

16. The system of claim 14, wherein the operations further comprise providing, to another machine in the order, a notification of availability of the new, second replication chain for the first key segment.

* * * * *